US011797083B2

(12) United States Patent
Wu

(10) Patent No.: US 11,797,083 B2
(45) Date of Patent: Oct. 24, 2023

(54) HEAD-MOUNTED DISPLAY SYSTEM AND 6-DEGREE-OF-FREEDOM TRACKING METHOD AND APPARATUS THEREOF

(71) Applicant: Qingdao Pico Technology Co., Ltd., Shandong (CN)

(72) Inventor: Tao Wu, Qingdao (CN)

(73) Assignee: QINGDAO PICO TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/881,138

(22) Filed: Aug. 4, 2022

(65) Prior Publication Data
US 2022/0374072 A1 Nov. 24, 2022

Related U.S. Application Data

(63) Continuation of application No. PCT/CN2021/130990, filed on Nov. 16, 2021.

(30) Foreign Application Priority Data

Nov. 16, 2020 (CN) .......................... 202011279532.5

(51) Int. Cl.
G06F 3/01 (2006.01)
G06T 7/80 (2017.01)
(Continued)

(52) U.S. Cl.
CPC .............. G06F 3/012 (2013.01); G06F 1/163 (2013.01); G06F 3/0308 (2013.01);
(Continued)

(58) Field of Classification Search
CPC ......... G06T 19/006; G06T 19/20; G06T 7/80; G06F 3/017; G06F 3/0325; G06F 3/011;
(Continued)

(56) References Cited

U.S. PATENT DOCUMENTS 10,204,406 B2 * 2/2019 Becker .................. G06V 20/56
10,447,265 B1 * 10/2019 Tompkins ............... G06F 3/011
(Continued)

FOREIGN PATENT DOCUMENTS

CN 106768361 A 5/2017
CN 109358754 A 2/2019
(Continued)

OTHER PUBLICATIONS

International Search Report (PCT/ISA/210) with translation and Written Opinion (PCT/ISA/237) dated Feb. 7, 2022, by the China National Intellectual Property Administration as the International Searching Authority for International Application No. PCT/CN2021/130990.
(Continued)

Primary Examiner — William Lu
(74) Attorney, Agent, or Firm — BUCHANAN INGERSOLL & ROONEY PC

(57) ABSTRACT

A head-mounted display system and a 6-degree-of-freedom tracking method and apparatus thereof are disclosed. The method includes: controlling two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras; calculating 6-degree-of-freedom tracking data of the head-mounted display device in a three-dimensional space in real time according to acquired image data of an odd-number frame of the two channels of tracking cameras; and calculating 6-degree-of-freedom tracking data of the handle controller in the three-dimensional space in real time according to acquired image
(Continued)

data of an even-number frame of the two channels of tracking cameras.

8 Claims, 4 Drawing Sheets

(51) Int. Cl.
*G06F 1/16* (2006.01)
*G06F 3/03* (2006.01)
*G06F 3/0346* (2013.01)
*H04N 23/73* (2023.01)
*H04N 23/90* (2023.01)

(52) U.S. Cl.
CPC .............. *G06F 3/0346* (2013.01); *G06T 7/80* (2017.01); *H04N 23/73* (2023.01); *H04N 23/90* (2023.01)

(58) Field of Classification Search
CPC ........ G06F 3/012; G06F 3/0346; G06F 3/013; G06F 1/163; G06F 3/0308; G06F 3/0304; G02B 27/017; G02B 27/0172; G02B 2027/0178; G02B 2027/014; G02B 2027/0138; H04N 1/00; H04N 23/73; H04N 23/90; H04N 23/74
See application file for complete search history.

(56) References Cited

U.S. PATENT DOCUMENTS

| | | | | |
|---|---|---|---|---|
| 10,477,157 B1* | 11/2019 | Shahdi | .................. | H04N 23/90 |
| 10,540,812 B1* | 1/2020 | Yildiz | .................. | G06T 15/50 |
| 10,719,953 B1* | 7/2020 | Ye | .................. | G06T 7/246 |
| 10,754,419 B2* | 8/2020 | Chung | .................. | G01S 5/0247 |
| 10,831,286 B1* | 11/2020 | Pepose | .................. | G06F 3/011 |
| 10,871,627 B1* | 12/2020 | Fang | .................. | G06F 3/012 |
| 11,006,030 B2* | 5/2021 | Lee | .................. | G06T 7/11 |
| 11,127,215 B1* | 9/2021 | Narvaez | .................. | G09G 3/001 |
| 11,128,636 B1* | 9/2021 | Jorasch | .................. | A61B 5/7405 |
| 2004/0256561 A1* | 12/2004 | Beuhler | .................. | H04N 23/84 |
| | | | | 348/E5.037 |
| 2006/0277571 A1* | 12/2006 | Marks | .................. | A63F 13/42 |
| | | | | 725/37 |
| 2009/0208221 A1* | 8/2009 | Sasai | .................. | H04B 10/116 |
| | | | | 398/118 |
| 2010/0033427 A1* | 2/2010 | Marks | .................. | H04N 1/00129 |
| | | | | 348/E5.022 |
| 2013/0326364 A1* | 12/2013 | Latta | .................. | G06F 3/012 |
| | | | | 715/751 |
| 2014/0062882 A1* | 3/2014 | Ozawa | .................. | G06F 3/038 |
| | | | | 345/158 |
| 2015/0054734 A1* | 2/2015 | Raghoebardajal | .... | G06F 3/0308 |
| | | | | 348/164 |
| 2015/0258431 A1* | 9/2015 | Stafford | .................. | A63F 13/212 |
| | | | | 463/31 |
| 2015/0310135 A1* | 10/2015 | Forsyth | .................. | G06F 30/13 |
| | | | | 703/1 |
| 2015/0371083 A1* | 12/2015 | Csaszar | .................. | H04N 23/90 |
| | | | | 382/103 |
| 2016/0022374 A1* | 1/2016 | Haider | .................. | A61B 17/142 |
| | | | | 606/96 |
| 2016/0191158 A1* | 6/2016 | Aoyama | .................. | H04B 10/54 |
| | | | | 398/172 |
| 2016/0338441 A1* | 11/2016 | London | .................. | A43B 5/00 |
| 2017/0195654 A1* | 7/2017 | Powers | .................. | H04N 23/11 |
| 2017/0273665 A1* | 9/2017 | Kapoor | .................. | A61B 6/12 |
| 2018/0017679 A1* | 1/2018 | Valouch | .................. | G01S 17/06 |
| 2018/0082482 A1* | 3/2018 | Motta | .................. | G06F 3/012 |
| 2018/0084232 A1* | 3/2018 | Belenkii | .................. | H04N 9/3161 |
| 2018/0110428 A1* | 4/2018 | Murakami | .................. | A61B 5/6893 |
| 2018/0272232 A1* | 9/2018 | Campbell | .................. | G06F 3/038 |
| 2018/0330521 A1* | 11/2018 | Samples | .................. | G06F 3/011 |
| 2019/0012835 A1* | 1/2019 | Bleyer | .................. | G06T 19/006 |
| 2019/0094989 A1* | 3/2019 | Chen | .................. | G06F 3/012 |
| 2019/0129036 A1* | 5/2019 | Valouch | .................. | H01L 51/426 |
| 2019/0146598 A1 | 5/2019 | Peri | | |
| 2019/0187779 A1* | 6/2019 | Miller | .................. | G08C 17/02 |
| 2019/0258058 A1* | 8/2019 | Fortin-Deschênes | .................. | G06T 19/006 |
| 2019/0261498 A1* | 8/2019 | Akita | .................. | A61B 1/00006 |
| 2019/0290297 A1* | 9/2019 | Haider | .................. | A61B 34/20 |
| 2019/0295213 A1* | 9/2019 | Price | .................. | G02B 27/017 |
| 2019/0295273 A1* | 9/2019 | Price | .................. | H04N 13/344 |
| 2019/0302907 A1* | 10/2019 | Wakimoto | .................. | G06F 3/0383 |
| 2019/0387168 A1* | 12/2019 | Smith | .................. | G06T 7/248 |
| 2020/0065584 A1 | 2/2020 | Iyer et al. | | |
| 2020/0097707 A1* | 3/2020 | Chou | .................. | H04N 23/611 |
| 2020/0264434 A1* | 8/2020 | Shin | .................. | G03H 1/02 |
| 2020/0301508 A1* | 9/2020 | Uchida | .................. | G06F 3/014 |
| 2021/0034149 A1* | 2/2021 | Lin | .................. | G06V 10/82 |
| 2021/0044767 A1* | 2/2021 | Rajasekaran | ........ | H04N 23/741 |
| 2021/0112647 A1* | 4/2021 | Coleman | .................. | H05B 47/19 |
| 2021/0118166 A1* | 4/2021 | Tremblay | .................. | B25J 9/1697 |
| 2021/0208673 A1* | 7/2021 | Forster | .................. | G06V 20/20 |
| 2021/0312918 A1* | 10/2021 | Herrmann | .................. | H04R 1/08 |
| 2021/0365064 A1* | 11/2021 | Liu | .................. | G06F 3/0346 |
| 2022/0103757 A1* | 3/2022 | Ding | .................. | H04N 5/04 |

FOREIGN PATENT DOCUMENTS

| | | |
|---|---|---|
| CN | 111061363 A | 4/2020 |
| CN | 111174683 A | 5/2020 |
| CN | 211121202 U | 7/2020 |
| CN | 211554996 U | 9/2020 |
| CN | 111930226 A | 11/2020 |
| CN | 112286343 A | 1/2021 |
| CN | 112527102 A | 3/2021 |
| WO | 2019246129 A2 | 12/2019 |

OTHER PUBLICATIONS

First Office Action with translation dated Nov. 16, 2020 by The State Intellectual Property Office of People's Republic of China in corresponding Chinese Patent Application No. 202011279532.5. (3 pages).

* cited by examiner

HEAD-MOUNTED DISPLAY SYSTEM AND 6-DEGREE-OF-FREEDOM TRACKING METHOD AND APPARATUS THEREOF

CROSS REFERENCE TO RELATED APPLICATIONS

This application is entered as a bypass continuation application under 35 U.S.C. § 111(a) of International Application No. PCT/CN2021/130990, filed on Nov. 16, 2021, which claims priority to Chinese Patent Application No. 202011279532.5, filed on Nov. 16, 2020. The embodiments of the earlier-filed applications are hereby incorporated herein in their entirety by reference.

TECHNICAL FIELD

The present application relates to the technical field of head-mounted display devices, and in particular to a head-mounted display system and a 6-degree-of-freedom (DOF) tracking method and apparatus thereof.

BACKGROUND

In the field of VR/AR/MR (virtual reality/augmented reality/mixed reality) techniques, the movement and rotation of the head and the hand of the user in the three-dimensional space are the most basic interactive data. In recent years, with the increase of mobile computing power, users hope to have unrestricted interactive demands in the field of VR/AR/MR techniques, and VR, AR or MR head-mounted devices in the form of all-in-one machine are more and more favored by users. Therefore, key performance parameters such as the 6-degree-of-freedom tracking accuracy, the tracking range and the tracking stability of the head and the hand of the user on mobile platforms are particularly important.

At present, in the field of head-mounted display devices, there are two mainstream solutions to solve the problem of the 6-degree-of-freedom tracking of the head and the hand of the user.

In the first type of solution, more than two (for example, four) tracking cameras with large view angles are provided on the head-mounted display device, the position and pose information of the head of the user in the three-dimensional space are tracked in real time by using the four tracking cameras with large view angles, and simultaneously the geometric pattern on the handle controller of the user is tracked in real time. The 6 degrees of freedom of the position and pose information of the handle controller of the user in the three-dimensional space are calculated in real time by a computer vision processing algorithm. In the second type of solution, two channels of tracking cameras with large view angles are provided on the head-mounted display device, the 6 degrees of freedom of the position and pose information of the head of the user in the three-dimensional space are tracked in real time by using the two tracking cameras with large view angles. At the same time, an electromagnetic or ultrasonic transmitter is provided at the handle controller, a corresponding electromagnetic or ultrasonic receiver is provided on the head-mounted display device, and the position and pose information of the handle controller in the three-dimensional space are solved in real time based on the electromagnetic or ultrasonic position tracking principle.

Regarding the first type of solution, although the tracking performance can be improved, from the perspective of head-mounted display devices, the greater quantity of tracking cameras will bring greater challenges to the cost, power consumption, placement design and heat dissipation design of the whole equipment. Moreover, the tracking camera is a component of relatively large power consumption and cost in the head-mounted display device. At present, head-mounted display devices are generally operated by using a rechargeable battery, and the increase of the tracking cameras will seriously affect the operation duration of the head-mounted display device. Regarding the second type of solution, the electromagnetic or ultrasonic sensor on the handle controller is sensitive to the electromagnetic or ultrasonic signal in the environment and is vulnerable to the interference of complex electromagnetic or ultrasonic signals in the environment, and therefore the electromagnetic or ultrasonic sensor will generate wrong electromagnetic or ultrasonic tracking data of the handle controller, whereby the tracking performance of the handle controller will be greatly challenged, resulting in drift, judder, jank and other phenomena of the handle controller in some application scenarios, which seriously affects the user experience.

SUMMARY

In view of that, the main object of the present application is to provide a head-mounted display system and a 6-degree-of-freedom tracking method and apparatus thereof, to solve or partially solve the above problems.

According to a first aspect of the present application, a 6-degree-of-freedom tracking method of a head-mounted display system is provided. The head-mounted display system comprises a head-mounted display device and a handle controller that are connected in wireless communication, the head-mounted display device is provided with two channels of tracking cameras and is provided with a first IMU sensor, the handle controller is provided with a preset quantity of LED lights and is provided with a second IMU sensor, and the method comprises:

controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras;

according to acquired image data of an odd-number frame of the two channels of tracking cameras and inertial-navigation data of the first IMU sensor, determining 6-degree-of-freedom tracking data of the head-mounted display device in a three-dimensional space; and according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space.

According to a second aspect of the present application, a head-mounted display device is provided with a processor, a memory storing computer-executable instructions, two channels of tracking cameras and a first IMU sensor, wherein the two channels of tracking cameras have same specifications and are provided on the head-mounted display device with a certain placement position-angle constraint;

when the computer-executable instructions stored in the memory are executed by the processor, the following 6-degree-of-freedom tracking method is implemented:

controlling the two channels of tracking cameras so that central moments of exposure durations of each frame of the two channels of tracking cameras are same, and controlling so that a lightening moment of the LED lights on a handle controller is synchronized with the middle moment of the exposure duration of an even-number frame of the two channels of tracking cameras, wherein the handle controller and the head-mounted display device are connected in wireless communication, and the handle controller is provided with a preset quantity of LED lights and is provided with a second IMU sensor;

according to acquired image data of an odd-number frame of the two channels of tracking cameras and inertial-navigation data of the first IMU sensor, determining 6-degree-of-freedom tracking data of the head-mounted display device in a three-dimensional space; and according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space.

According to a third aspect of the present application, a 6-degree-of-freedom tracking apparatus of a head-mounted display system is provided. The head-mounted display system comprises a head-mounted display device and a handle controller that are connected in wireless communication, the head-mounted display device is provided with two channels of tracking cameras and is provided with a first IMU sensor, the handle controller is provided with a preset quantity of LED lights and is provided with a second IMU sensor, and the apparatus comprises:

a synchronization controlling module configured for controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras;

an odd-number-frame tracking module configured for, according to acquired image data of an odd-number frame of the two channels of tracking cameras and inertial-navigation data of the first IMU sensor, determining 6-degree-of-freedom tracking data of the head-mounted display device in a three-dimensional space; and an even-number-frame tracking module configured for, according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space.

According to a fourth aspect of the present application, a computer-readable storage medium is provided. The computer-readable storage medium stores one or more programs. When executed by a processor, the one or more programs implement the above 6-degree-of-freedom tracking method of a head-mounted display system.

At least one of the above technical solutions of the present application can achieve the following advantageous effects.

In the head-mounted display system and the 6-degree-of-freedom tracking method and apparatus thereof according to the embodiments of the present application, only two channels of tracking cameras are provided at the head-mounted display device, which can reduce the cost and the power consumption as compared with 6-degree-of-freedom tracking solutions with more than two channels of tracking cameras. By optimizing the placement positions and the angles of the two channels of tracking cameras on the head-mounted display device, controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras, the tracking field of view (FOV) and the tracking accuracy of the head-mounted display device and handle controller are guaranteed. By separately controlling the odd-number frames and the even-number frames of the images of the two channels of tracking cameras, the image data of the odd-number frames is used to calculate the 6-degree-of-freedom tracking data of the head-mounted display device, i.e., the head of the user, in the three-dimensional space, and the image data of the even-number frames is used to calculate the 6-degree-of-freedom tracking data of the handle controller, i.e., the hand of the user, in the three-dimensional space. In this way, by separately controlling the odd-number frames and the even-number frames, the problems of system load pressure and CPU resource conflict when the two 6-degree-of-freedom tracking modules at the head and the hand of the user are running simultaneously can be alleviated, whereby the system power consumption can be reduced and the stability of the tracking performance can be improved.

BRIEF DESCRIPTION OF DRAWINGS

By reading the following detailed description of the preferable embodiments, various other advantages and benefits will become clear to a person skilled in the art. The drawings are merely intended to show the preferable embodiments, and are not to be considered as limiting the present application. Furthermore, throughout the drawings, the same reference signs denote the same elements. In the drawings.

DETAILED DESCRIPTION

The exemplary embodiments of the present application will be described in further detail below with reference to the drawings. The purpose of providing those embodiments is to more clearly understand the present application, and to completely convey the scope of the present application to a person skilled in the art. Although the drawings illustrate the exemplary embodiments of the present application, it should be understood that the present application may be implemented in various forms, which should not be limited by the embodiments illustrated herein.

In order to solve the problem of the 6-degree-of-freedom tracking of the head and the hand of the user of head-mounted display systems, the present application proposes to provide two channels of tracking cameras on the head-mounted display device with a certain placement position-angle constraint, and provide a preset quantity of LED lights on the handle controller with a certain geometric-specification constraint. By optimizing the placement positions and the angles of the two channels of tracking cameras on the head-mounted display device, controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras, the tracking field of view FOV and the tracking accuracy of the head-mounted display device and handle controller are guaranteed. By separately controlling the odd-number frames and the even-number frames of the images of the two channels of tracking cameras, the image data of the odd-number frames is used to calculate the 6-degree-of-freedom tracking data of the head-mounted display device, i.e., the head of the user, in the three-dimensional space, and the image data of the even-number frames is used to calculate the 6-degree-of-freedom tracking data of the handle controller, i.e., the hand of the user, in the three-dimensional space. In this way, by separately controlling the odd-number frames and the even-number frames, the problems of system load pressure and CPU resource conflict when the two 6-degree-of-freedom tracking modules at the head and the hand of the user are running simultaneously can be alleviated, whereby the system power consumption can be reduced and the stability of the tracking performance can be improved.

Figure 1:
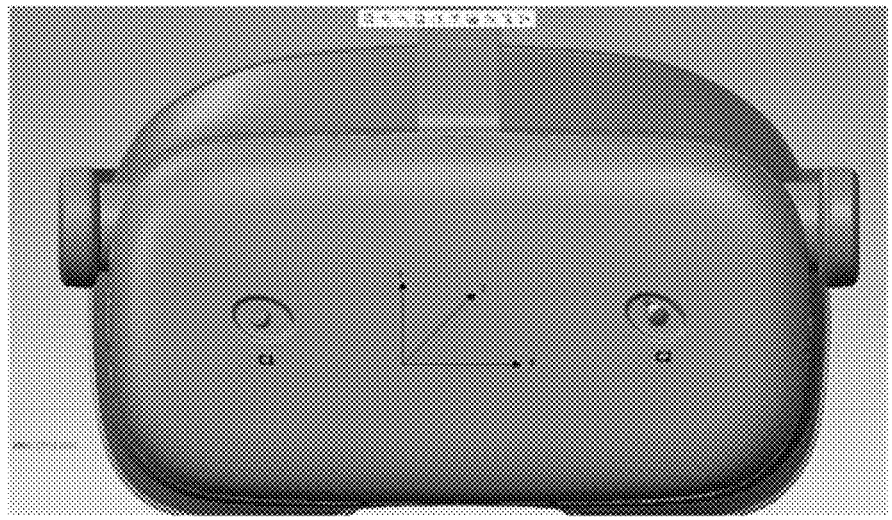
FIG. 1 is a schematic diagram of the appearance of a head-mounted display device according to an embodiment of the present application.

FIG. 1 is a schematic diagram of the appearance of a head-mounted display device according to an embodiment of the present application. Referring to FIG. 1, the head-mounted display device according to the embodiment of the present application is provided with two channels of tracking cameras with a certain placement position-angle constraint, and is provided with an IMU (inertial measurement unit) sensor (not shown in FIG. 1). For the convenience of distinguishing, the IMU sensor in the head-mounted display device is named the first IMU sensor.

In an embodiment of the present application, both of the two channels of tracking cameras are monochrome cameras, and the collected images are black-and-white images, because the problem of 6-degree-of-freedom tracking and locating can be solved as long as the camera captures the bright and dark information in the environment, and the color information is not needed. The advantage of using the monochrome camera is that its price and cost are relatively low, and the tracking and locating accuracy will not be affected.

In an embodiment of the present application, the specifications of the two channels of tracking cameras are the same. That facilitates the physical synchronization of the two channels of tracking cameras, so that the central moments of the exposure durations of each frame of the two channels of tracking cameras are controlled to be the same by using the physical-synchronization mechanism.

Some key specification parameters of each of the two channels of tracking cameras are described as follows:

a) the FOV (field of view) of the tracking cameras should be at least 130°*100°*150° (H*V*D), wherein H represents the horizontal field of view (FOV-H), V represents the vertical field of view (FOV-V), and D represents the diagonal field of view (FOV-D);

b) the shooting frame rate of the tracking cameras should be at least 60 Hz;

c) the resolution of the tracking cameras is video graphics array (VGA) or 720p, wherein VGA represents a resolution of 640*480;

d) the tracking cameras adopt an exposure mode of global shutter; and e) the lenses of the tracking cameras can pass both visible light band (band range: 480 nm to 670 nm) and 850 nm infrared light.

In an embodiment of the present application, the CMOS sensor type of the tracking cameras may be OV7251 or OV9282.

The two channels of tracking cameras are provided on the head-mounted display device with a certain placement position-angle constraint. For the convenience of distinguishing and explanation, referring to FIG. 1, the tracking camera on the left is named C1 and the tracking camera on the right is named C2. When the head-mounted display device is worn on the head of the user, a vertical coordinate system is established with the center of the head-mounted display device being the origin of the coordinate system. The X-axis represents the horizontal direction, the Y-axis represents the vertical direction and the Z-axis represents the front-rear direction. The placement position-angle constraint of these two channels of tracking cameras comprises:

a) the tracking camera C1 on the left is rotatable around the X-axis upwardly by a first angle range, and is rotatable around the Y-axis leftwardly by a second angle range. For example, C1 may rotate around the X-axis upwardly by any angle between 15° and 20°, and rotate around the Y-axis leftwardly by any angle between 19° and 25°.

b) the tracking camera C2 on the right is rotatable around the X-axis downwardly by a third angle range, and is rotatable around the Y-axis rightwardly by a fourth angle range. For example, C2 may rotate around the X-axis downwardly by any angle between 25° and 35°, and rotate around the Y-axis rightwardly by any angle between 19° and 25°.

c) both of the two channels of tracking cameras are movable in an X-axis direction and a Y-axis direction, and the distance between optical-axis center points of the two channels of tracking cameras is within a first distance range in the X-axis direction and within a second distance range in the Y-axis direction. For example, the distance between the optical-axis center point of C1 and the optical-axis center point of C2 on the Y-axis may be in the range of 2 mm to 5 mm, and the distance between them in the X-axis direction may be in the range of 80 mm to 100 mm.

By using the two channels of tracking cameras with the above specifications and the placement position-angle constraints, a tracking field of view FOV area of at least 170°*150° (H*V) can be spliced.

Figure 2:
FIG. 2 is a schematic diagram of the appearance of a handle controller according to an embodiment of the present application.

FIG. 2 is a schematic diagram of the appearance of a handle controller according to an embodiment of the present application. Referring to FIG. 2, the handle controller according to the embodiment of the present application is provided with a preset quantity of LED lights with a certain geometric-rule constraint and is provided with an IMU sensor (not shown in FIG. 2). For the convenience of distinguishing, the IMU sensor in the handle controller is named the second IMU sensor.

The quantity of the LED lights on the handle controller is related to the size information, the tracking accuracy and the tracking stability of the handle controller, and the placement positions and the angles of the tracking cameras on the head-mounted display device. Those information should be comprehensively considered when designing the quantity of the LED lights and their distribution on the handle controller.

In an embodiment of the present application, 17 LED lights are provided on the handle controller according to certain geometric rules. Those LED lights are self-luminous, and the emitted band may be an infrared light band or a visible light band.

Figure 3:
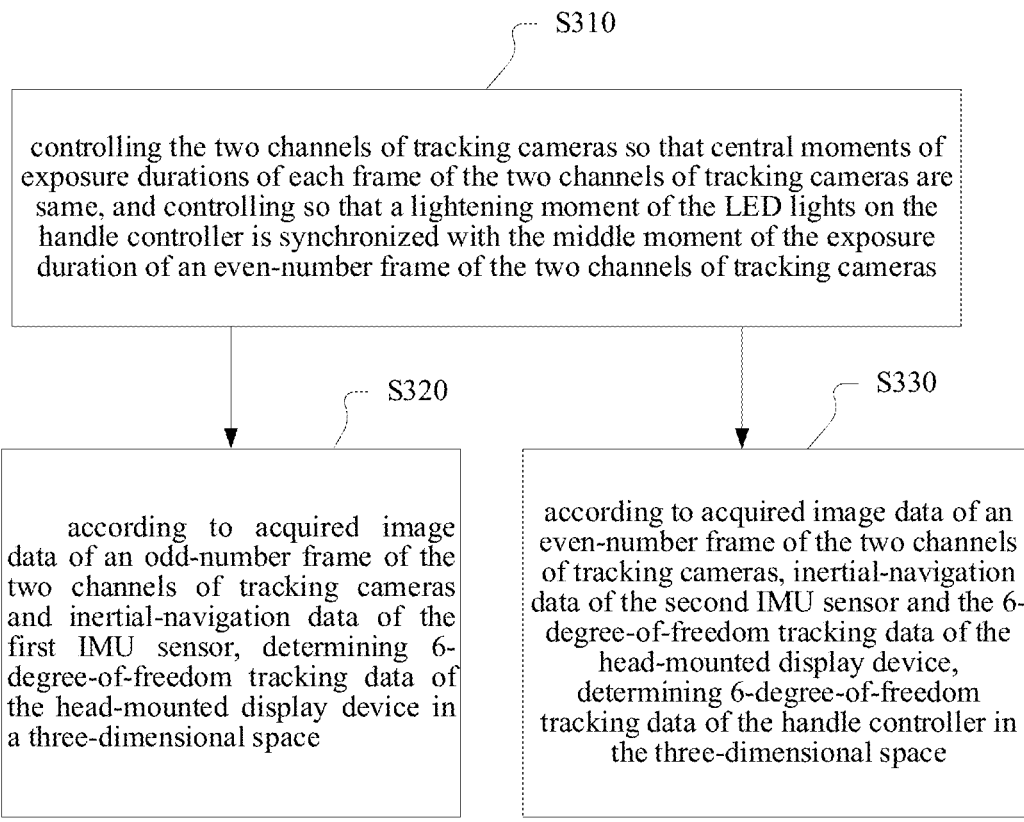
FIG. 3 is a schematic flowchart of a 6-degree-of-freedom tracking method of a head-mounted display system according to an embodiment of the present application.

FIG. 3 is a schematic flowchart of a 6-degree-of-freedom tracking method of a head-mounted display system according to an embodiment of the present application. The head-mounted display system comprises a head-mounted display device and a handle controller that are connected in wireless communication. The head-mounted display device is provided with two channels of tracking cameras with a certain placement position-angle constraint and is provided with a first IMU sensor. The handle controller is provided with a preset quantity of LED lights with a certain geometric-rule constraint and is provided with a second IMU sensor. Referring to FIG. 3, the 6-degree-of-freedom tracking method of a head-mounted display system according to an embodiment of the present application comprises the following steps S310 to S330.

Step S310: controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras.

The two channels of tracking cameras according to the present application have the same specifications and are physically synchronized. By using the physical-synchronization mechanism, the central moments of the exposure durations of each frame of the two channels of tracking cameras can be controlled to be the same; in other words, the two channels of tracking cameras can be controlled to accurately conduct synchronous exposure.

A receiving module and a transmitting module of a wireless-communication module are provided in the head-mounted display device and the handle controller. The protocol of the wireless-communication module may be 2.4G or Bluetooth communication.

By using the wireless-communication module, it can be controlled that a lightening moment of the LED lights on the handle controller is synchronized with the middle moment of the exposure duration of an even-number frame of the two channels of tracking cameras; in other words, the LED light can be controlled to be lightened in the exposure duration of an even-number frame of the tracking cameras. In order to make the LED lights on the handle controller fully lightened during the exposure duration of the even-number frames of the tracking cameras, considering the synchronization accuracy error between the lightening moment of the LED lights on the handle controller and the central moment of the exposure duration of the tracking cameras by the wireless-communication module, the turning-on duration of the LED lights may be set to be a predetermined duration (such as 30 μs) longer than the start and end moments of the exposure duration of the tracking camera.

It should be noted that, because the marking point on the handle controller is a self-luminous LED light, considering that the longer the exposure time of the tracking cameras is when shooting moving objects, the more serious the motion blur problem, the exposure time parameter of the even-number frames will be set relatively low according to experience, which will make the LED lights on the handle controller lightened for a very short time. Generally, it can meet the requirements of the tracking algorithm of the handle controller at about 100 μs, which also optimizes the power consumption of the handle controller to a certain extent.

Step S320: according to acquired image data of an odd-number frame of the two channels of tracking cameras and inertial-navigation data of the first IMU sensor, determining 6-degree-of-freedom tracking data of the head-mounted display device in a three-dimensional space.

When calculating the 6-degree-of-freedom tracking data of the head-mounted display device in the three-dimensional space in real time, the embodiment of the present application chooses to use the image data of the odd-number frames of two channels of tracking cameras in combination with the inertial-navigation data of the IMU sensor in the head-mounted display device at the current moment.

It can be understood that the present application may also choose to use the image data of the even-number frames of two channels of tracking cameras to calculate the 6-degree-of-freedom tracking data of the head-mounted display device in real time. Corresponding, when calculating the 6-degree-of-freedom tracking data of the handle controller in real time, the present application chooses to use the image data of the odd-number frames of two channels of tracking cameras.

Step S330: according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space.

The embodiment of the present application chooses to use the image data of the even-number frames of two channels of tracking cameras in combination with the inertial-navigation data of the IMU sensor in the handle controller at the current moment and the 6-degree-of-freedom tracking data of the head-mounted display device at the current moment to calculate the 6-degree-of-freedom tracking data of the handle controller in the three-dimensional space in real time. When calculating the 6-degree-of-freedom tracking data of the handle controller in real time, the 6-degree-of-freedom tracking data of the head-mounted display device at the current moment is referred to because the 6-degree-of-freedom tracking data of the handle controller in the three-dimensional space calculated in real time is the 6-degree-of-freedom tracking data relative to the coordinate origin of the IMU sensor in the head-mounted display device.

The above steps S320 and S330 are parallel and staggered in the operation times. In other words, when the image of the tracking cameras is an odd-number frame, the 6-degree-of-freedom tracking data of the head-mounted display device is calculated, and the 6-degree-of-freedom tracking module of the head-mounted display device is run. When the image of the tracking cameras is an even-number frame, the 6-degree-of-freedom tracking data of the handle controller is calculated, and the 6-degree-of-freedom tracking module of the handle controller is run. In this way, by separately controlling the odd-number frames and the even-number frames, the problems of system load pressure and CPU resource conflict when the two channels of tracking modules are running simultaneously can be alleviated, whereby the system power consumption can be reduced and the stability of the tracking performance can be improved.

Figure 4:
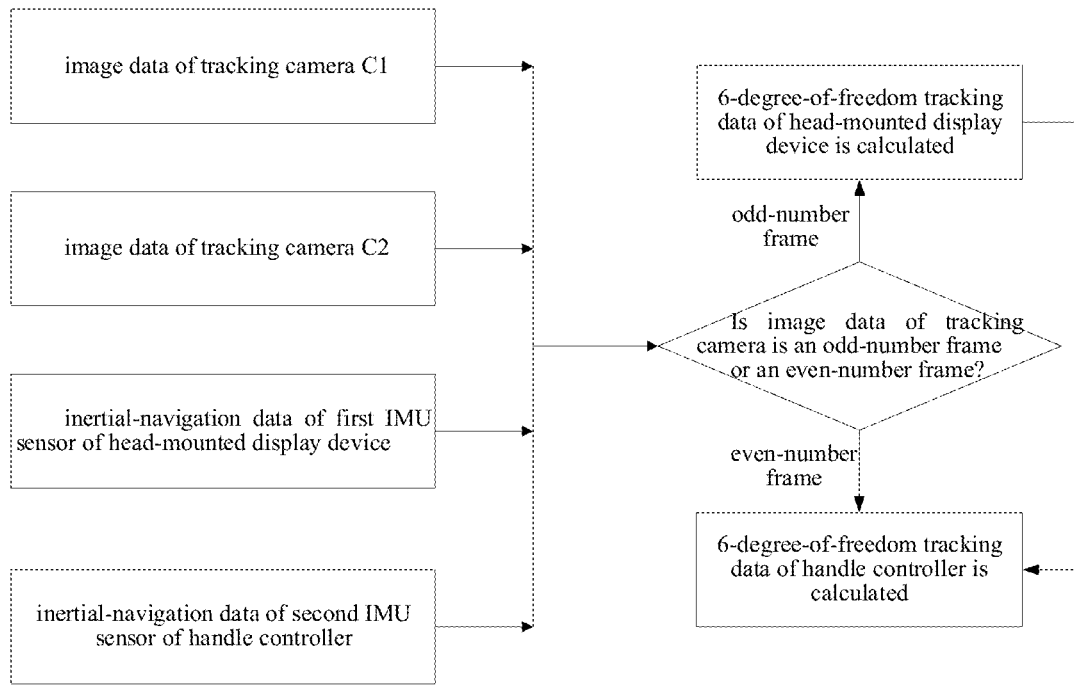
FIG. 4 is a schematic block diagram of the implementation of a 6-degree-of-freedom tracking method of a head-mounted display system according to an embodiment of the present application.

FIG. 4 is a schematic block diagram of the implementation of a 6-degree-of-freedom tracking method of a head-mounted display system according to an embodiment of the present application. Referring to FIG. 4, in the embodiment of the present application, four channels of data are required to be collected in real time, including the image data of the two channels of tracking cameras (C1 and C2), one channel of the inertial-navigation data of the first IMU sensor provided on the head-mounted display device, and one channel of the inertial-navigation data of the second IMU sensor provided on the handle controller. In the present embodiment, the image data of the odd-number frames and even-number frames of the two channels of tracking cameras are independently controlled. When the image data of an odd-number frame of the two channels of tracking cameras is acquired, the 6-degree-of-freedom tracking data of the head-mounted display device in the three-dimensional space is calculated in real time by referring to the inertial-navigation data of the first IMU sensor at the current moment. When the image data of an even-number frame of the two channels of tracking cameras are acquired, the 6-degree-of-freedom tracking data of the handle controller in the three-dimensional space is calculated in real time by referring to the inertial-navigation data of the second IMU sensor at the current moment and by referring to the 6-degree-of-freedom tracking data of the head-mounted display device at the current moment.

In an embodiment of the present application, the 6-degree-of-freedom tracking method of a head-mounted display system according to an embodiment of the present application further comprises: before performing 6-degree-of-freedom tracking, calibrating the two channels of tracking cameras and the first IMU sensor, to determine calibration parameters including intrinsic parameters and distortion parameters of each of the two channels of tracking cameras, rotation and translation parameters relative to the first IMU sensor, and basic calibration parameters of the first IMU sensor; and determining a unified coordinate system based on the calibration parameters, with a physical position of the first IMU sensor being a coordinate position of an origin of the unified coordinate system.

For example, the conventional Zhang Zhengyou's calibration method may be used to calibrate the tracking cameras. Of course, a person skilled in the art may also use other calibration methods according to actual situations, which is not particularly limited here.

In order to simplify the calculation, a unified coordinate system may be used when calculating the 6-degree-of-freedom tracking data of the head-mounted display device and the 6-degree-of-freedom tracking data of the handle controller according to the calibration parameters. In the embodiment of the present application, the physical position of the first IMU sensor of the head-mounted display device is selected as the coordinate position of the origin of the unified coordinate system.

In an embodiment of the present application, the above step S320 particularly comprises:
  according to image data of a current odd-number frame of the two channels of tracking cameras, the calibration parameters and the inertial-navigation data of the first IMU sensor at a current moment, determining the 6-degree-of-freedom tracking data of the head-mounted display device in the three-dimensional space; and
  according to the 6-degree-of-freedom tracking data of the head-mounted display device in the three-dimensional space at a frame rate corresponding to the current odd-number frame and the inertial-navigation data of the first IMU sensor at the current moment, determining by pre-integration the 6-degree-of-freedom tracking data of the head-mounted display device in the three-dimensional space at a first preset higher frame rate.

As stated above, based on the calibration parameters of the two channels of tracking cameras and the first IMU sensor, the coordinate position of the origin of the unified coordinate system according to the embodiment of the present application is selected as the physical position of the IMU sensor of the head-mounted display device, i.e., the first IMU sensor.

When the image data of a current odd-number frame of the two channels of tracking cameras is acquired, by referring to the inertial-navigation data of the first IMU sensor at the current moment, and by referring to the calibration parameters of the tracking cameras and the first IMU sensor, the 6-degree-of-freedom tracking data of the head-mounted display device in the three-dimensional space is calculated in real time.

With respect to the acquired 6-degree-of-freedom tracking data of the head-mounted display device in the three-dimensional space at a frame rate corresponding to the current odd-number frame, by referring to the inertial-navigation data of the first IMU sensor at a higher frequency at the current moment, the latest 6-degree-of-freedom tracking data of the head-mounted display device in the three-dimensional space at a first preset higher frame rate is pre-integrated in real time.

The frequency of the inertial-navigation data generated by the first IMU sensor can generally reach 2000 Hz/s of data packets. Because the output frequency is inversely proportional to the signal-to-noise ratio of the inertial-navigation data, the 6-degree-of-freedom tracking data of the head-mounted display device can be predicted and interpolated into the output frequency of 1000 Hz/s; in other words, the first preset higher frame rate is set to 1000 Hz/s.

In an embodiment of the present application, the SLAM (simultaneous localization and mapping) implementation architecture is selected to calculate the 6-degree-of-freedom tracking data of the head-mounted display device in the three-dimensional space in real time. Initially the main application scenario of SLAM is to solve the locating and mapping of robots. The embodiment of the present application uses the SLAM implementation architecture to solve the problem of locating and mapping of the head-mounted display device in the three-dimensional space.

It should be noted that, in order to better solve the problem of locating and mapping of the head-mounted display device in the three-dimensional space, the embodiment of the present application makes some algorithm improvements to the traditional SLAM implementation architecture.

First improved algorithm: in the initialization stage, when stereo matching is performed on the two-dimensional feature-recognition data of the two channels of tracking cameras to obtain three-dimensional spatial data, both the data of the intersection part and the data of the non-intersection part of the two-dimensional feature-recognition data of the two channels of tracking cameras are used. The first improved algorithm can make full use of all the two-dimensional feature-recognition data of the two channels of tracking cameras to increase the stability of feature tracking.

Second improved algorithm: the stereo matching is only performed on the two-dimensional feature-recognition data of the two channels of tracking cameras in the initialization stage. After initialization, the stereo matching is no longer performed in the tracking stage, and the two-dimensional feature-recognition data of the two channels of tracking cameras is directly transmitted to the tracking module configured for pose estimation and feature tracking. The second improved algorithm can reduce the computation burden of the system and improve the tracking accuracy.

Third improved algorithm: when the tracking module performs pose estimation, a sliding window is provided. The sliding window is used to select discontinuous key-frame data or representative-frame data and select continuous frame data with characteristic changes for pose estimation. The third improved algorithm can reduce the redundancy of the sampled data and reduce the computation burden while ensuring the accuracy of the pose estimation.

Figure 5:
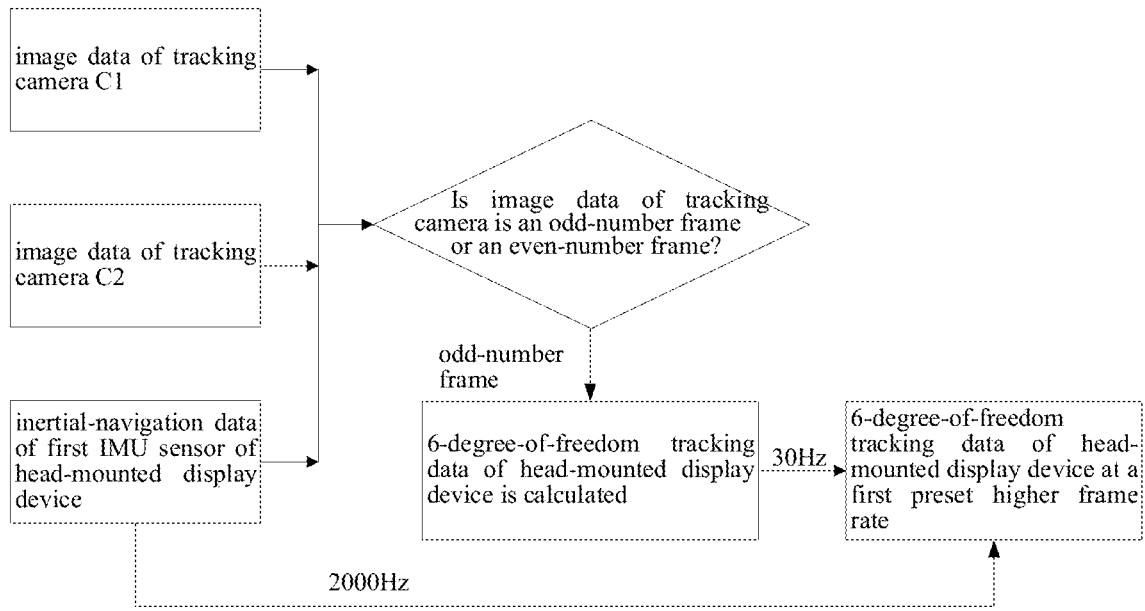
FIG. 5 is a schematic block diagram of the implementation of a 6-degree-of-freedom tracking method of a head-mounted display device according to an embodiment of the present application.

FIG. 5 is a schematic block diagram of the implementation of a 6-degree-of-freedom tracking method of a head-mounted display device according to an embodiment of the present application. Referring to FIG. 5, in the embodiment of the present application, three channels of data are required to be collected in real time, including the image data of the two channels of tracking cameras (C1 and C2) and one channel of the inertial-navigation data of the first IMU sensor provided in the head-mounted display device. In the present embodiment, only when the image data of the odd-number frames of the two channels of tracking cameras are received, the 6-degree-of-freedom tracking algorithm of the head-mounted display device is run, and the 6-degree-of-freedom tracking data of the head-mounted display device in the three-dimensional space is calculated in real time. With respect to the acquired 6-degree-of-freedom tracking data of the head-mounted display device at the frame rate corresponding to the current odd-number frame (e.g., 30 Hz), by referring to the inertial-navigation data of the first IMU sensor at a higher frequency (e.g., 2000 Hz), the 6-degree-of-freedom tracking data of the head-mounted display device at the first preset higher frame rate (e.g., 1000 Hz) is obtained by pre-integration (prediction and frame interpolation).

In an embodiment of the present application, the above step S330 particularly comprises:

according to image data of a current even-number frame of the two channels of tracking cameras, continuing to detect light spots corresponding to the LED lights on the handle controller on each channel of images (blob detection), to acquire two-dimensional-coordinate data of the light spots of each of the LED lights on two channels of images;

according to the two-dimensional-coordinate data of the light spots of each of the LED lights on the two channels of images, the inertial-navigation data of the second IMU sensor at the current moment, the 6-degree-of-freedom tracking data of the head-mounted display device at the current moment and the calibration parameters of the two channels of tracking cameras and the first IMU sensor, determining the 6-degree-of-freedom tracking data of the handle controller relative to the unified coordinate system in real time by using an PNP solution algorithm, i.e., the 6-degree-of-freedom tracking data of the handle controller when the physical position of the first IMU sensor in the head-mounted display device is the coordinate origin; and according to the 6-degree-of-freedom tracking data of the handle controller relative to the unified coordinate system at a frame rate corresponding to the current even-number frame and the inertial-navigation data of the second IMU sensor, determining by pre-integration the 6-degree-of-freedom tracking data of the handle controller in the three-dimensional space at a second preset higher frame rate.

The PNP solving algorithm refers to an algorithm that minimizes the reprojection error to solve the extrinsic parameters of a camera when the intrinsic parameters of the camera are known or unknown by using multiple pairs of 3D and 2D matching points. In the present embodiment, as the PNP solving algorithm, the Gaussian Newton gradient descent algorithm is selected to calculate and iteratively optimize the 6-degree-of-freedom tracking data.

The 6-degree-of-freedom output frequency of the handle controller mainly depends on the inertial navigation frequency of the second IMU sensor of the handle controller and the bandwidth of the inertial-navigation data of the second IMU sensor passing through the wireless-transmission module. In the present embodiment, the 6-degree-of-freedom output frequency of the handle controller is predicted and frame-interpolated to 250 Hz/s; in other words, the second preset higher frame rate is set to 250 Hz/s.

Figure 6:
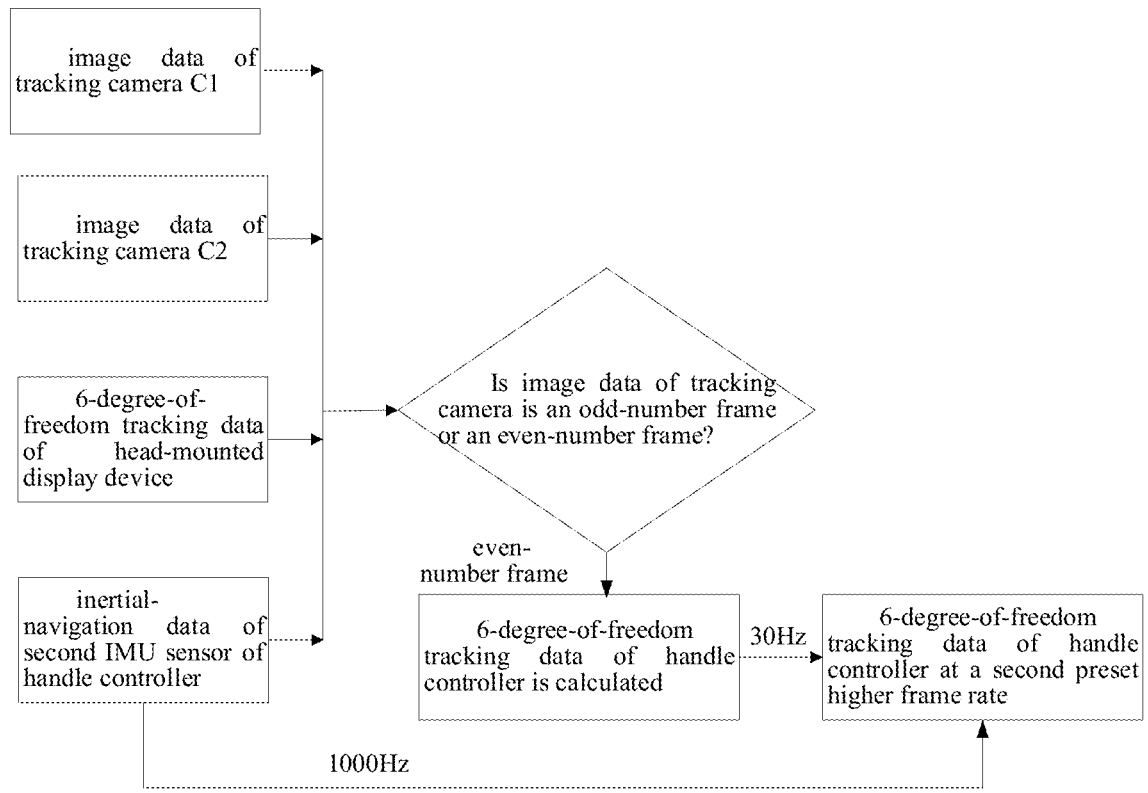
FIG. 6 is a schematic block diagram of the implementation of a 6-degree-of-freedom tracking method of a handle controller according to an embodiment of the present application.

FIG. 6 is a schematic block diagram of the implementation of a 6-degree-of-freedom tracking method of a handle controller according to an embodiment of the present application. Referring to FIG. 6, in the embodiment of the present application, four channels of data are required to be collected in real time, including the image data of the two channels of tracking cameras (C1 and C2), one channel of the 6-degree-of-freedom tracking data of the head-mounted display device at the current moment, and one channel of the inertial-navigation data of the second IMU sensor provided in the handle controller at the current moment In the present embodiment, only when the image data of the even-number frames of the two channels of tracking cameras are received, the 6-degree-of-freedom tracking algorithm of the handle controller is run, and the 6-degree-of-freedom tracking data of the handle controller in the three-dimensional space is calculated in real time. With respect to the acquired 6-degree-of-freedom tracking data of the handle controller at the frame rate corresponding to the current even-number frame (e.g., 30 Hz), by referring to the inertial-navigation data of the second IMU sensor at a higher frequency (e.g., 1000 Hz), the 6-degree-of-freedom tracking data of the handle controller at the second preset higher frame rate (e.g., 250 Hz) is obtained by pre-integration (prediction and frame interpolation).

Figure 7:
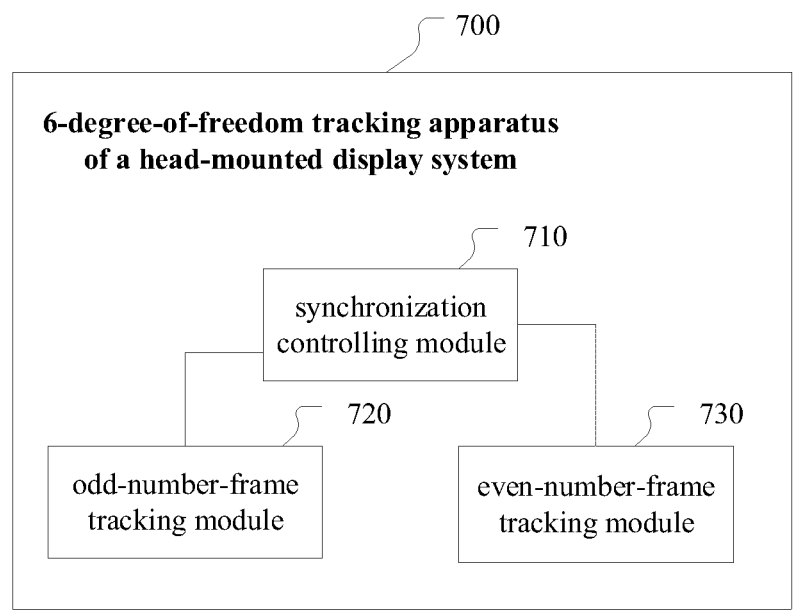
FIG. 7 is a block diagram of a 6-degree-of-freedom tracking apparatus of a head-mounted display system according to an embodiment of the present application.

An embodiment of the present application further provides a 6-degree-of-freedom tracking apparatus of a head-mounted display system, which belongs to the same technical concept as the above 6-degree-of-freedom tracking method of a head-mounted display system. FIG. 7 is a block diagram of a 6-degree-of-freedom tracking apparatus of a head-mounted display system according to an embodiment of the present application. Referring to FIG. 7, the 6-degree-of-freedom tracking apparatus 700 of a head-mounted display system comprises: a synchronization controlling module 710, an odd-number-frame tracking module 720 and an even-number-frame tracking module 730.

The synchronization controlling module 710 is configured for controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras.

The odd-number-frame tracking module 720 is configured for, according to acquired image data of an odd-number frame of the two channels of tracking cameras and inertial-navigation data of the first IMU sensor, determining 6-degree-of-freedom tracking data of the head-mounted display device in a three-dimensional space.

The even-number-frame tracking module 730 is configured for, according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space.

It should be noted that the odd-number-frame tracking module 720 and the even-number-frame tracking module 730 are parallel modules, and their running times are staggered. In other words, when the image of the tracking cameras is an odd-number frame, the 6-degree-of-freedom tracking data of the head-mounted display device is calculated, and the 6-degree-of-freedom tracking module of the head-mounted display device is run. When the image of the tracking cameras is an even-number frame, the 6-degree-of-freedom tracking data of the handle controller is calculated, and the 6-degree-of-freedom tracking module of the handle controller is run. In this way, by separately controlling the odd-number frames and the even-number frames, the problems of system load pressure and CPU resource conflict when the two channels of tracking modules are running simultaneously can be alleviated, whereby the system power consumption can be reduced and the stability of the tracking performance can be improved.

In an embodiment of the present application, the 6-degree-of-freedom tracking apparatus 700 of a head-mounted display system according to the present application further comprises:
a calibration-parameter calibrating module configured for, before performing 6-degree-of-freedom tracking, calibrating the two channels of tracking cameras and the first IMU sensor, to determine calibration parameters, wherein the calibration parameters include intrinsic parameters and distortion parameters of each of the two channels of tracking cameras, rotation and translation parameters relative to the first IMU sensor, and basic calibration parameters of the first IMU sensor; and
a unified-coordinate-system module configured for determining a unified coordinate system based on the calibration parameters, with a physical position of the first IMU sensor being a coordinate position of an origin of the unified coordinate system.

In an embodiment of the present application, the odd-number-frame tracking module 720 is particularly configured for:
according to image data of a current even-number frame of the two channels of tracking cameras and the calibration parameters and the inertial-navigation data of the first IMU sensor, determining the 6-degree-of-freedom tracking data of the head-mounted display device in the three-dimensional space; and
according to the 6-degree-of-freedom tracking data of the head-mounted display device in the three-dimensional space at a frame rate corresponding to the current odd-number frame and the inertial-navigation data of the first IMU sensor, determining by pre-integration the 6-degree-of-freedom tracking data of the head-mounted display device in the three-dimensional space at a first preset higher frame rate.

In an embodiment of the present application, the even-number-frame tracking module 730 is particularly configured for:
according to image data of a current even-number frame of the two channels of tracking cameras, continuing to detect light spots corresponding to the LED lights on the handle controller on each channel of images, to acquire two-dimensional-coordinate data of the light spots of each of the LED lights on two channels of images;
according to the two-dimensional-coordinate data of the light spots of each of the LED lights on the two channels of images, the inertial-navigation data of the second IMU sensor at the current moment, the 6-degree-of-freedom tracking data of the head-mounted display device at the current moment and the calibration parameters, determining the 6-degree-of-freedom tracking data of the handle controller relative to the unified coordinate system by using an PNP solution algorithm; and
according to the 6-degree-of-freedom tracking data of the handle controller relative to the unified coordinate system at a frame rate corresponding to the current even-number frame and the inertial-navigation data of the second IMU sensor, determining by pre-integration the 6-degree-of-freedom tracking data of the handle controller in the three-dimensional space at a second preset higher frame rate.

Figure 8:
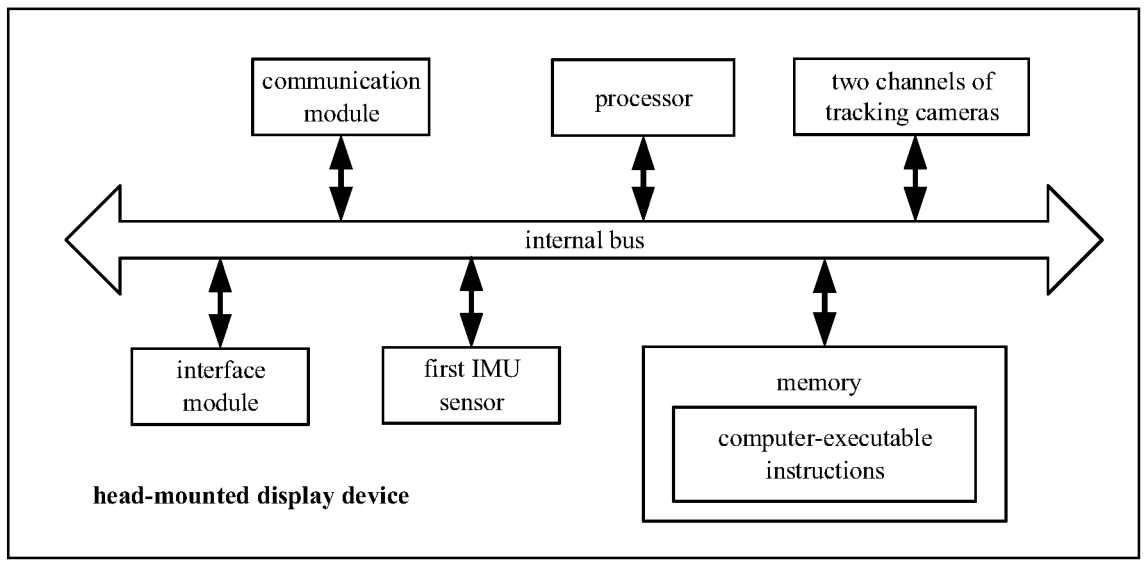
FIG. 8 is a schematic structural diagram of a head-mounted display device according to an embodiment of the present application.

It should be noted that:
FIG. 8 is a schematic structural diagram of a head-mounted display device. Referring to FIG. 8, at the hardware level, the head-mounted display device comprises a memory, a processor, two channels of tracking cameras and a first IMU sensor, and optionally comprises an interface module, a communication module, etc. The memory may comprise an internal memory, such as a high-speed random access memory (RAM), or a non-volatile memory, such as at least one disk memory, etc. Of course, the head-mounted display device may also comprise other hardware as required.

The processor, the interface module, the communication module and the memory may be interconnected through an internal bus. The internal bus may be an ISA (Industry Standard Architecture) bus, a PCI (Peripheral Component Interconnect) bus or an EISA (Extended Industry Standard Architecture) bus, etc. The bus may be divided into an address bus, a data bus, a control bus, etc. For ease of representation, only one bidirectional arrow is used in FIG. 8, but that does not mean that there is only one bus or one type of bus.

The memory is configured to store computer-executable instructions. The memory provides the computer-executable instructions to the processor through the internal bus.

The processor executes the computer-executable instructions stored in the memory and is particularly configured to implement the following operations:

controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras, wherein the handle controller and the head-mounted display device are connected in wireless communication, and the handle controller is provided with a preset quantity of LED lights and is provided with a second IMU sensor;

according to acquired image data of an odd-number frame of the two channels of tracking cameras and inertial-navigation data of the first IMU sensor, determining 6-degree-of-freedom tracking data of the head-mounted display device in a three-dimensional space; and according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space.

The functions performed by the above 6-degree-of-freedom tracking method of a head-mounted display system according to the embodiment shown in FIG. 3 of the present application may be applied to the processor or implemented by the processor. The processor may be an integrated circuit chip having signal processing capabilities. In the implementation process, the steps of the method described above may be completed by integrated logic circuits (in the form of hardware) or instructions (in the form of software) in the processor.

An embodiment of the present application further provides a computer-readable storage medium, wherein the computer-readable storage medium stores one or more programs. When executed by a processor, the one or more programs implement the above 6-degree-of-freedom tracking method of a head-mounted display system.

A person skilled in the art should understand that the embodiments of the present application may be provided as a method, a system, or a computer program product. Therefore, the present application may take the form of a complete hardware embodiment, a complete software embodiment, or an embodiment combining software and hardware. Furthermore, the present application may take the form of a computer program product implemented on one or more computer-usable storage media (including but not limited to a disk storage, a CD-ROM, an optical memory and so on) containing a computer-usable program code therein.

The computer program instructions may also be stored in a computer-readable memory that can instruct the computers or the other programmable data processing device to operate in a specific mode, so that the instructions stored in the computer-readable memory generate an article comprising an instruction device, and the instruction device implements the functions specified in one or more flows of a flow chart and/or one or more blocks of a block diagram.

The computer program instructions may also be loaded to the computers or the other programmable data processing device, so that the computers or the other programmable data processing device implement a series of operation steps to generate the computer-implemented processes, whereby the instructions executed in the computers or the other programmable data processing device provide the steps for implementing the functions specified in one or more flows of the flow chart and/or one or more blocks of the block diagram.

In a typical configuration, the computing device comprises one or more processors (CPUs), inputting/outputting interfaces, network interfaces, and internal memory.

The internal memory may include a non-permanent memory, a random access memory (RAM) and/or a non-volatile internal memory and other forms of computer-readable media, such as a read-only memory (ROM) or a flash RAM. The internal memory is an example of the computer-readable media.

The computer-readable media include permanent and non-permanent, removable and non-removable media, and information storage can be realized by using any method or technique. The information may be computer-readable instructions, data structures, modules of programs, or other data. As defined herein, the computer-readable media do not include transitory computer-readable media, such as modulated data signals and carriers.

It should be noted that the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

It should be understood that although the terms "first", "second", "third", etc. may be used to describe various information in the present application, those information should not be limited by these terms. Those terms are only used to distinguish the same type of information from each other. For example, the first information may also be referred to as the second information without departing from the scope of the present application, and similarly, the second information may also be referred to as the first information.

The above are merely embodiments of the present application, and are not indented to limit the present application. For a person skilled in the art, the present application may have various modifications and variations. Any modifications, equivalent substitutions and improvements that are made within the spirit and the principle of the present application should fall within the protection scope of the claims of the present application.

What is claimed is:

1. A 6-degree-of-freedom tracking method of a head-mounted display system, wherein the head-mounted display system comprises a head-mounted display device and a handle controller that are connected in wireless communication, the head-mounted display device is provided with two channels of tracking cameras and is provided with a first IMU sensor, the handle controller is provided with a preset quantity of LED lights and is provided with a second IMU sensor, and the method comprises:

controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras;

according to acquired image data of an odd-number frame of the two channels of tracking cameras and inertial-navigation data of the first IMU sensor, determining 6-degree-of-freedom tracking data of the head-mounted display device in a three-dimensional space;

according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space, before performing 6-degree-of-freedom tracking, calibrating the two channels of tracking cameras and the first IMU sensor to determine calibration parameters, wherein the calibration parameters include intrinsic parameters and distortion parameters of each of the two channels of tracking cameras, rotation and translation parameters relative to the first IMU sensor, and basic calibration parameters of the first IMU sensor; and determining a unified coordinate system based on the calibration parameters, with a physical position of the first IMU sensor being a coordinate position of an origin of the unified coordinate system, wherein the step of, according to the acquired image data of the even-number frame of the two channels of tracking cameras and the inertial-navigation data of the second IMU sensor and the 6-degree-of-freedom tracking data of the head-mounted display device, determining the 6-degree-of-freedom tracking data of the handle controller in the three-dimensional space comprises:

according to image data of a current even-number frame of the two channels of tracking cameras, continuing to detect light spots corresponding to the LED lights on the handle controller on each channel of images, to acquire two-dimensional-coordinate data of the light spots of each of the LED lights on two channels of images;

according to the two-dimensional-coordinate data of the light spots of each of the LED lights on the two channels of images, the inertial-navigation data of the second IMU sensor at the current moment, the 6-degree-of-freedom tracking data of the head-mounted display device at the current moment and the calibration parameters, determining the 6-degree-of-freedom tracking data of the handle controller relative to the unified coordinate system by using an PNP solution algorithm; and according to the 6-degree-of-freedom tracking data of the handle controller relative to the unified coordinate system at a frame rate corresponding to the current even-number frame and the inertial-navigation data of the second IMU sensor, determining by pre-integration the 6-degree-of-freedom tracking data of the handle controller in the three-dimensional space at a second preset higher frame rate.

2. The method according to claim 1, wherein the step of, according to the acquired image data of the odd-number frame of the two channels of tracking cameras and the inertial-navigation data of the first IMU sensor, determining the 6-degree-of-freedom tracking data of the head-mounted display device in the three-dimensional space comprises:

according to image data of a current odd-number frame of the two channels of tracking cameras, the calibration parameters and the inertial-navigation data of the first IMU sensor at a current moment, determining the 6-degree-of-freedom tracking data of the head-mounted display device in the three-dimensional space; and according to the 6-degree-of-freedom tracking data of the head-mounted display device in the three-dimensional space at a frame rate corresponding to the current odd-number frame and the inertial-navigation data of the first IMU sensor at the current moment, determining by pre-integration the 6-degree-of-freedom tracking data of the head-mounted display device in the three-dimensional space at a first preset higher frame rate.

3. The method according to claim 1, wherein the two channels of tracking cameras have same specifications, wherein specification parameters include: a field of view FOV of at least 130° *100° *150° (H*V*D), a frame rate of at least 60 Hz, a resolution of at least VGA or 720p, an exposure mode of global shutter, and a lens capable of passing both visible light band and an 850 nm infrared light; and with respect to a vertical coordinate system established with a center of the head-mounted display device as an origin of the coordinate system, in which an X-axis represents a horizontal direction, a Y-axis represents an vertical direction, and a Z-axis represents a front-rear direction, the placement position-angle constraint of the two channels of tracking cameras on the head-mounted display device comprises: the tracking camera on the left is rotatable around the X-axis upwardly by a first angle range, and is rotatable around the Y-axis leftwardly by a second angle range; the tracking camera on the right is rotatable around the X-axis downwardly by a third angle range, and is rotatable around the Y-axis rightwardly by a fourth angle range; and both of the two channels of tracking cameras are movable in an X-axis direction and a Y-axis direction, and a distance between optical-axis center points of the two channels of tracking cameras is within a first distance range in the X-axis direction and within a second distance range in the Y-axis direction.

4. A 6-degree-of-freedom tracking apparatus of a head-mounted display system, wherein the head-mounted display system comprises a head-mounted display device and a handle controller that are connected in wireless communication, the head-mounted display device is provided with two channels of tracking cameras and is provided with a first IMU sensor, the handle controller is provided with a preset quantity of LED lights and is provided with a second IMU sensor, and the apparatus comprises:

a synchronization controlling module configured for controlling the two channels of tracking cameras so that central moments of exposure durations of each frame of the two channels of tracking cameras are same, and controlling so that a lightening moment of the LED lights on the handle controller is synchronized with the middle moment of the exposure duration of an even-number frame of the two channels of tracking cameras;

an odd-number-frame tracking module configured for, according to acquired image data of an odd-number frame of the two channels of tracking cameras and inertial-navigation data of the first IMU sensor, determining 6-degree-of-freedom tracking data of the head-mounted display device in a three-dimensional space;

an even-number-frame tracking module configured for, according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space;

a calibration-parameter calibrating module configured for, before performing 6-degree-of-freedom tracking, calibrating the two channels of tracking cameras and the first IMU sensor to determine calibration parameters, wherein the calibration parameters include intrinsic parameters and distortion parameters of each of the two channels of tracking cameras, rotation and translation parameters relative to the first IMU sensor, and basic calibration parameters of the first IMU sensor; and a unified-coordinate-system module configured for determining a unified coordinate system based on the calibration parameters, with a physical position of the first IMU sensor being a coordinate position of an origin of the unified coordinate system, wherein the even-number-frame tracking module is particularly configured for:

according to image data of a current even-number frame of the two channels of tracking cameras, continuing to detect light spots corresponding to the LED lights on the handle controller on each channel of images, to acquire two-dimensional-coordinate data of the light spots of each of the LED lights on two channels of images;

according to the two-dimensional-coordinate data of the light spots of each of the LED lights on the two channels of images, the inertial-navigation data of the second IMU sensor at the current moment, the 6-degree-of-freedom tracking data of the head-mounted display device at the current moment and the calibration parameters, determining the 6-degree-of-freedom tracking data of the handle controller relative to the unified coordinate system by using an PNP solution algorithm; and according to the 6-degree-of-freedom tracking data of the handle controller relative to the unified coordinate system at a frame rate corresponding to the current even-number frame and the inertial-navigation data of the second IMU sensor, determining by pre-integration the 6-degree-of-freedom tracking data of the handle controller in the three-dimensional space at a second preset higher frame rate.

5. The apparatus according to claim 4, wherein the odd-number-frame tracking module is particularly configured for:

according to image data of a current even-number frame of the two channels of tracking cameras and the calibration parameters and the inertial-navigation data of the first IMU sensor, determining the 6-degree-of-freedom tracking data of the head-mounted display device in the three-dimensional space; and according to the 6-degree-of-freedom tracking data of the head-mounted display device in the three-dimensional space at a frame rate corresponding to the current odd-number frame and the inertial-navigation data of the first IMU sensor, determining by pre-integration the 6-degree-of-freedom tracking data of the head-mounted display device in the three-dimensional space at a first preset higher frame rate.

6. A head-mounted display device, wherein the head-mounted display device is provided with a processor, a memory storing computer-executable instructions, two channels of tracking cameras and a first IMU sensor, wherein the two channels of tracking cameras have same specifications and are provided with a certain placement position-angle constraint on the head-mounted device;

when the computer-executable instructions stored in the memory are executed by the processor, the following 6-degree-of-freedom tracking method is implemented:

controlling the two channels of tracking cameras so that central moments of exposure durations of each frame of the two channels of tracking cameras are same, and controlling so that a lightening moment of the LED lights on a handle controller is synchronized with the middle moment of the exposure duration of an even-number frame of the two channels of tracking cameras, wherein the handle controller and the head-mounted display device are connected in wireless communication, and the handle controller is provided with a preset quantity of LED lights and is provided with a second IMU sensor;

according to acquired image data of an odd-number frame of the two channels of tracking cameras and inertial-navigation data of the first IMU sensor, determining 6-degree-of-freedom tracking data of the head-mounted display device in a three-dimensional space; and according to acquired image data of an even-number frame of the two channels of tracking cameras, inertial-navigation data of the second IMU sensor and the 6-degree-of-freedom tracking data of the head-mounted display device, determining 6-degree-of-freedom tracking data of the handle controller in the three-dimensional space, wherein the 6-degree-of-freedom tracking method implemented when the computer-executable instructions stored in the memory are executed by the processor further comprises:

before performing 6-degree-of-freedom tracking, calibrating the two channels of tracking cameras and the first IMU sensor to determine calibration parameters, wherein the calibration parameters include intrinsic parameters and distortion parameters of each of the two channels of tracking cameras, rotation and translation parameters relative to the first IMU sensor, and basic calibration parameters of the first IMU sensor; and determining a unified coordinate system based on the calibration parameters, with a physical position of the first IMU sensor being a coordinate position of an origin of the unified coordinate system, wherein the step of, according to the acquired image data of the even-number frame of the two channels of tracking cameras and the inertial-navigation data of the second IMU sensor and the 6-degree-of-freedom tracking data of the head-mounted display device, determining the 6-degree-of-freedom tracking data of the handle controller in the three-dimensional space comprises:

according to image data of a current even-number frame of the two channels of tracking cameras, continuing to detect light spots corresponding to the LED lights on the handle controller on each channel of images, to acquire two-dimensional-coordinate data of the light spots of each of the LED lights on two channels of images;

according to the two-dimensional-coordinate data of the light spots of each of the LED lights on the two channels of images, the inertial-navigation data of the second IMU sensor at the current moment, the 6-degree-of-freedom tracking data of the head-mounted display device at the current moment and the calibration parameters, determining the 6-degree-of-freedom tracking data of the handle controller relative to the unified coordinate system by using an PNP solution algorithm; and according to the 6-degree-of-freedom tracking data of the handle controller relative to the unified coordinate system at a frame rate corresponding to the current even-number frame and the inertial-navigation data of the second IMU sensor, determining by pre-integration the 6-degree-of-freedom tracking data of the handle controller in the three-dimensional space at a second preset higher frame rate.

7. The head-mounted display device according to claim 6, wherein the step of, according to the acquired image data of the odd-number frame of the two channels of tracking cameras and the inertial-navigation data of the first IMU sensor, determining the 6-degree-of-freedom tracking data of the head-mounted display device in the three-dimensional space comprises:

according to image data of a current odd-number frame of the two channels of tracking cameras, the calibration parameters and the inertial-navigation data of the first IMU sensor at a current moment, determining the 6-degree-of-freedom tracking data of the head-mounted display device in the three-dimensional space; and according to the 6-degree-of-freedom tracking data of the head-mounted display device in the three-dimensional space at a frame rate corresponding to the current odd-number frame and the inertial-navigation data of the first IMU sensor at the current moment, determining by pre-integration the 6-degree-of-freedom tracking data of the head-mounted display device in the three-dimensional space at a first preset higher frame rate.

8. The head-mounted display device according to claim 6, wherein the two channels of tracking cameras have same specifications, wherein specification parameters include: a field of view FOV of at least 130° *100° *150° (H*V*D), a frame rate of at least 60 Hz, a resolution of at least VGA or 720p, an exposure mode of global shutter, and a lens capable of passing both visible light band and an 850 nm infrared light; and with respect to a vertical coordinate system established with a center of the head-mounted display device as an origin of the coordinate system, in which an X-axis represents a horizontal direction, a Y-axis represents an vertical direction, and a Z-axis represents a front-rear direction, the placement position-angle constraint of the two channels of tracking cameras on the head-mounted display device comprises: the tracking camera on the left is rotatable around the X-axis upwardly by a first angle range, and is rotatable around the Y-axis leftwardly by a second angle range; the tracking camera on the right is rotatable around the X-axis downwardly by a third angle range, and is rotatable around the Y-axis rightwardly by a fourth angle range; and both of the two channels of tracking cameras are movable in an X-axis direction and a Y-axis direction, and a distance between optical-axis center points of the two channels of tracking cameras is within a first distance range in the X-axis direction and within a second distance range in the Y-axis direction.

* * * * *